United States Patent [19]

Hayford

[11] 4,444,699

[45] Apr. 24, 1984

[54] CAPSULE MANUFACTURE

[75] Inventor: Donald E. Hayford, Appleton, Wis.

[73] Assignee: Appleton Papers Inc., Appleton, Wis.

[21] Appl. No.: 370,323

[22] Filed: Apr. 20, 1982

[51] Int. Cl.$^3$ .............................................. B01J 13/02
[52] U.S. Cl. ................................. 264/4.7; 428/402.21
[58] Field of Search .................... 264/4.7; 428/402.21; 528/254

[56] References Cited

U.S. PATENT DOCUMENTS

| | | | |
|---|---|---|---|
| 2,312,693 | 3/1943 | D'Alelio | 528/254 X |
| 2,653,921 | 9/1953 | Sulzer | 528/254 |
| 3,928,272 | 12/1975 | Brancato et al. | 528/232 |
| 4,100,103 | 7/1978 | Foris et al. | 264/4.7 X |
| 4,233,178 | 11/1980 | Fuchigami | 428/402.21 |
| 4,251,386 | 2/1981 | Saeki et al. | 264/4.7 |

Primary Examiner—Richard D. Lovering
Attorney, Agent, or Firm—E. Frank McKinney; Paul S. Phillips, Jr.

[57] ABSTRACT

A process is disclosed for performing encapsulation, en masse, by an in situ polymerization reaction to yield capsule wall material. The polymerization comprises a reaction between melamine and formaldehyde and/or polycondensation of monomeric methylol melamine or etherified methylol melamine, or a low molecular weight polymer thereof, in an aqueous vehicle and the reaction is conducted in the presence of negatively-charged, carboxyl-substituted polyelectrolyte material and certain salts, both dissolved in the vehicle. The disclosed encapsulation process permits the manufacture of microcapsules with more impermeable walls and/or lower capsule batch viscosities.

11 Claims, No Drawings

CAPSULE MANUFACTURE

This invention relates to a process for manufacturing minute capsules, en masse, in a liquid manufacturing vehicle. The process of the invention involves liquid-liquid phase separation of a relatively concentrated solution of polymeric material to be used in the formation of walls for the minute capsules. More particularly, the process of this invention involves the polycondensation of melamine with formaldehyde or the in situ polymerization of methylol melamine or etherified methylol melamine, or a low molecular weight polymer thereof, in an aqueous vehicle and the reaction is conducted in the presence of polyelectrolyte material and certain salts.

A method of encapsulating to produce microcapsules in which the capsule wall material is produced by the acid catalysis of a water-soluble urea-formaldehyde precondensate and a water-soluble melamine-formaldehyde precondensate in the presence of a water-soluble polymer, which is capable of being cross-linked by said precondensates, is disclosed in U.S. Pat. No. 4,105,823.

A method of encapsulating by an in situ reaction of melamine and formaldehyde and/or polymerization of monomeric methylol melamine or etherified methylol melamine, or a low molecular weight polymer thereof in the presence of negatively-charged, carboxyl-substituted linear aliphatic hydrocarbon polyelectrolyte material dissolved in an aqueous vehicle is disclosed in U.S. Pat. No. 4,100,103.

A method of encapsulating by forming a dispersion of intended capsule core material in an aqueous solution of a styrene-maleic anhydride copolymer, adding a melamine-formaldehyde precondensate and heating the mixture to form a microcapsule wall is disclosed in U.S. Pat. No. 4,233,178.

The most widespread use of microcapsules to date has been in certain kinds of pressure-sensitive copying systems. In one such system, disclosed in U.S. Pat. No. 2,730,456 and commonly known as manifold record material, an upper sheet is coated on its lower surface with microcapsules containing a solution of a colorless chromogenic material, and a lower sheet is coated on its upper surface with a color developing co-reactant material, e.g. an acidic clay, a phenolic resin or certain organic salts. For applications which require more than two plies in the record material, a number of intermediate sheets are also provided, each of which is coated on its lower surface with microcapsules and on its upper surface with acidic material. Pressure exerted on the sheets by writing or typing ruptures the microcapsules, thereby releasing the chromogenic material solution on to the co-reactant material on the next lower sheet and giving rise to a chemical reaction which develops the color of the chromogenic material.

In another such system, known as a self-contained system and disclosed in U.S. Pat. Nos. 2,730,457 and 4,197,346, microcapsules, containing a chromogenic material solution, and a co-reactant material are coated on the same surface of a sheet of paper. Pressure exerted on the sheet by writing or typing causes the capsules to rupture and release the chromogenic material, which then reacts with the co-reactant material on the sheet to produce a color.

Microcapsules for use in the above-described pressure-sensitive copying systems have a series of stringent property requirements so as to produce an optimum copying system. Some of these properties are capsule strength, color, size distribution range and wall integrity (impermeability).

The process according to U.S. Pat. No. 4,100,103 has been successfully used to encapsulate solutions of chromogenic materials for use in pressure sensitive copying papers. Of the eligible carboxyl group system modifiers disclosed in U.S. Pat. No. 4,100,103 the hydrolyzed maleic anhydride copolymers are preferred. Among the hydrolyzed maleic anhydride copolymers disclosed in U.S. Pat. No. 4,100,103, the most preferred is poly(ethylene-co-maleic anhydride) (hereinafter referred to as EMA) because of the combination of commercial availability and the balance of properties provided to the encapsulation process.

The cost of EMA has recently been rising rapidly, producing a consequent rise in the cost of the microcapsules manufactured by the process in which EMA constitutes the system modifier. Because of cost and availability considerations, poly(acrylic acid) (hereinafter referred to as PAA), is a logical substitute for EMA as the system modifier. While microcapsules made from a process according to U.S. Pat. No. 4,100,103, in which PAA constitutes the system modifier, are of commercial quality for use in pressure-sensitive copying paper, they do not possess the optimum balance of properties obtained when EMA is utilized.

One function of the system modifier in U.S. Pat. No. 4,100,103 is to take an active part in the polymerization reaction of the starting materials used to form the condensation polymer which makes up the resulting capsule walls. Under equivalent reaction conditions, use of PAA results in slower capsule wall formation than when EMA is used.

Another function of the system modifier in U.S. Pat. No. 4,100,103 is to act as an emulsifying agent to promote and maintain the separation of the individual droplets of the intended capsule core material in the aqueous manufacturing vehicle. When PAA is utilized as the system modifier, emulsification of the intended capsule core material requires more energy input and time and produces a poorer drop size distribution than when EMA is employed. The poorer emulsifying power of PAA can be offset by mixing in, prior to emulsification, the starting materials (e.g. methylated methylol melamine) employed in the in situ polymerization reaction to form the condensation polymer which makes up the resulting capsule walls. The presence of methylated methylol melamine or a low molecular weight polymer thereof, (hereinafter referred to as MMM) during the intended core material emulsification step can result in the premature polymerization of the MMM. This tendency of the MMM to prematurely react under these circumstances is reduced by raising the pH of the PAA-MMM solution to the highest level at which emulsification of the intended core material can be obtained. Once a satisfactory intended core material emulsion is obtained, the pH of the emulsion must be reduced in order to obtain the deposition of satisfactory capsule walls in a reasonable amount of time. This alternative procedure outlined above has been further modified by utilizing the steps of:

(1) establishing an aqueous solution of a mixture the MMM and a portion of the PAA, at as high of a pH at which a satisfactory emulsion can be achieved, (2) emulsifying the intended capsule core material in the aqueous solution, (3) adding the remainder of the PAA solution at an appropriately lower pH so that the resulting mixture will be at a pH closer to being optimum for polycondensation of the MMM, and (4) heating the mixture to accelerate the polycondensation of the MMM and the subsequent deposition of the condensation polymer on the dispersed capsule core material.

Microcapsules made by the above-described procedure are approximately equal in end-use properties for pressure-sensitive copying paper to those manufactured when EMA is employed as the system modifier in the simpler and more easily controlled process.

It has now been surprisingly learned that when the process performed substantially as above through the emulsification step is altered by the introduction of a solution of one or more of certain salts in place of part or all of the additional PAA solution, the microcapsules resulting after polycondensation of the MMM possess improved walls from the permeability standpoint. The resulting microcapsule slurry has a lower viscosity than a slurry made by the process of steps (1) through (4) described previously. These properties permit easier movement of the wet capsule slurry, coating the capsule slurry at higher solids with a consequent lower energy requirement for water removal during the drying of the coating and the production of a capsule-containing sheet with a greater shelf life.

It has further been learned that the introduction, prior to polycondensation of the starting material, of any of these same salts into the processes of U.S. Pat. Nos. 4,100,103 and 4,233,178, when any eligible carboxyl group system modifier is employed, results in the unexpectedly improved properties of increased capsule wall integrity and reduced capsule slurry viscosity.

It is, therefore, an object of the present invention to provide a capsule manufacturing process wherein capsules having walls of increased impermeability are produced.

It is yet another object of the present invention to provide a capsule manufacturing process wherein the resulting capsule slurry has a reduced viscosity.

It is a specific object of this invention to provide an encapsulating process wherein the capsule wall material comprises a melamine-formaldehyde polymeric material wherein the melamine-formaldehyde wall material is generated by an in situ condensation and/or polymerization reaction in the presence of a negatively-charged, carboxyl-substituted polyelectrolyte material and certain salts dissolved in the capsule manufacturing vehicle.

These and other objects and advantages of the present invention will become more apparent to those skilled in the art from a consideration of the following specification and claims.

The starting materials used to form the condensation polymer which makes up the resulting capsule walls and the system modifiers described in U.S. Pat. Nos. 4,100,103 and 4,233,178 are eligible for use in the present invention. In addition to the materials and procedures described in U.S. Pat. Nos. 4,100,103 and 4,233,178, which are hereby incorporated by reference, the process of the present invention involves the incorporation of one or more of certain salts into the aqueous manufacturing vehicle prior to completion of the polycondensation of the starting material used to form the condensation polymer which makes up the resulting capsule wall. These eligible salts include those in which the cations are selected from the group consisting of cations from Periodic Group IA, and tertiary and quaternary ammonium cations and the anions are selected from the group consisting of chloride, sulfate, phosphate, nitrate, polyphosphate, citrate, maleate and fumarate. Preferred among the eligible salts are those selected from the group consisting of Periodic Group IA cations and chloride, sulfate, phosphate and nitrate anions. Most preferred is potassium phosphate. It has been found that a wide range of amount of salt can be used in the present invention. However, an amount of about one to about 10 percent by weight, based on the weight of aqueous manufacturing vehicle, is advantageously employed. The upper limit is chosen more from the standpoint of convenience rather than functionality. Amounts greater than 10 percent by weight can be utilized, but no additional improvements in properties are obtained.

The beneficial and unexpected properties resulting from the practice of the present invention can be realized with a considerable number of polyelectrolyte materials including poly(ethylene-co-maleic anhydride), poly(methyl vinyl ether-co-maleic anhydride), poly(acrylic acid), poly(propylene-co-maleic anhydride), poly)propylene-co-maleic anhydride), poly(butadiene-co-maleic anhydride), poly(vinyl acetate-co-maleic anhydride) and poly(styrene-co-maleic anhydride). The greatest benefits are derived when the polyelectrolyte material is poly (acrylic acid) or poly(styrene-co-maleic anhydride). It has been found that a wide range of amount of polyelectrolyte material can be used in the present invention. However, an amount of about 0.4 to about 15 percent by weight, based on the weight of aqueous manufacturing vehicle, is advantageously employed. The upper limit is chosen more from the standpoint of economics and convenience rather than functionality. Amounts greater than 15 percent by weight can be satisfactorily utilized, but no additional improvements in properties are obtained.

The process is operable over a wide range of temperatures but a temperature range of about 40° C. to about 95° C. is preferred. More preferred is the temperature range of about 50° C. to about 60° C.

The following examples are given merely as illustrative of the present invention and are not to be considered as limiting. All parts and percentages throughout the application are by weight, unless specified otherwise. All solutions, unless otherwise designated, are aqueous solutions.

The intended capsule core material for all of the examples to follow was a solution of chromogenic compounds as listed in Table I.

TABLE I

| Concentration | Chromogenic Material |
|---|---|
| 1.7% | 3,3-bis(p-dimethylaminophenyl)-6-dimethylaminophthalide |
| 0.55% | 2'-anilino-3'-methyl-6'-diethylaminofluoran |
| 0.55% | 3,3-bis(1-ethyl-2-methylindol-3-yl)phthalide |

The solvent for the chromogenic compound solution was a mixture of 65 parts of a $C_{10}$–$C_{13}$ alkylbenzene and 35 parts of benzylated xylenes.

EXAMPLE 1

In this Example a solution of 144 grams of a 12.5% of poly(acrylic acid) having a molecular weight of approximately less than 300,000 ("Acrysol A-5", Rohm & Haas) was partially neutralized with 9.55 grams of tri-isopropanolamine and diluted with water to 840 grams total. To 805 grams of this solution, which had a pH of 4.55, were added 115 grams of a partially methylated methylol melamine resin ("Cymel 382", American Cyanamid) to give, with stirring, a clear solution, pH 4.95. Into 880 grams of the resulting solution was emulsified 990 grams of the chromogenic compound solution of Table I to yield a 1 to 10 micron droplet size range. Into each of three containers was added a 170 gram portion of the above emulsion. The containers were mounted in a room temperature water bath, continuous stirring was provided and one of the following materials was added alternatively to each stirring emulsion:

| Example | Material Added |
| --- | --- |
| 1A | 30 grams water |
| 1B | 30 grams of a 13.3% solution of $KH_2PO_4$ |
| 1C | 30 grams of a solution containing 3.5 grams of poly(acrylic acid) having a molecular weight of less than 50,000 ("Acrysol A-1", Rohm & Haas) and 0.55 grams KOH |

The water bath was heated to 56° C. and held at this temperature for eight hours to initiate and complete encapsulation. The heating of the bath was then discontinued and stirring of the batches was continued in the cooling water bath overnight. The following day 2.2 ml. of 28% ammonium hydroxide was added to each batch, sufficient 30% KOH was added to each to yield a pH of about 9.5 and sufficient water was added to each batch to bring the total weight of each to 217 grams.

The viscosity of each capsule batch was measured with a Brookfield LVF viscometer at 25° C. and the results were reported in centipoise (cps) units.

The impermeability (or conversely, the permeability) of each capsule batch was determined by the following procedure:

The following mixture was prepared:

| Amount | Material |
| --- | --- |
| 100 grams | Capsule slurry |
| 15 grams | 20% ethoxylated corn starch binder |
| 10 grams | Wheat starch granules |
| 190 grams | Water |

The above mixture was dispersed, coated on a paper base with a wire-wound coating rod and the coating dried for one minute in an oven at 150° C. to yield a dry coating weight of 4 grams of dried capsules per square meter. A nine square inch portion of the capsule coated paper was steeped for 10 minutes with 20 ml. of room temperature toluene to extract only the chromogenic material which was not contained within capsules having impermeable walls. The color of the chromogenic material was developed with stannic chloride and the amount of color determined colormetrically. Another nine square inch portion of the same capsule coated paper was extracted with 100 ml. of a solution of three volume percent of concentrated hydrochloric acid in methanol. This procedure, which is performed at 55° C. for one hour, extracts all of the chromogenic material from the sheet. The amount of color in this extract, developed by the presence of hydrochloric acid, was determined colormetrically. The permeability of the coated capsules, expressed as a percentage, is determined by the following formula:

$$\text{Permeability} = \frac{\text{quantity of color in toluene extract}}{\text{quantity of color in methanol extract}} \times 100$$

This permeability, or capsule wall integrity, method is based upon the principle that the room temperature toluene extract removes only the chromogenic material which is not contained within satisfactory, impermeable capsules. The hot methanol extract destroys all capsule walls and removes all of the chromogenic materials from the sheet. These permeability results can be used to predict quality of capsules, for example, the ability of coated capsules to retain their contents during long term storage.

Using the above-described viscosity and permeability procedures, the three capsule batches of Example 1 were compared:

| Example | Total poly (acrylic acid) | Added salt | Batch pH after encapsulation | Final batch viscosity | Permeability |
| --- | --- | --- | --- | --- | --- |
| 1A | 1.5 grams | none | 5.65 | 1030 cps | 34.8% |
| 1B | 1.5 grams | 4 grams $KH_2PO_4$ | 5.10 | 44 cps | 3.5% |
| 1C | 5.0 grams | none | 4.90 | 1350 cps | 5.5% |

Thus, a batch, which would have a poorer than desired permeability (batch 1A), can be brought into a much more favorable permeability region through the use of additional PAA (batch 1C), but at an increase in batch viscosity. By the use of an added salt ($KH_2PO$), the resulting batch (1B) has both a very satisfactory permeability value and a very low batch viscosity.

EXAMPLE 2

The procedure of Example 1 was substantially repeated through the emulsification step using the same relative amounts of the same components. Into 170 gram portions of the resulting emulsion was added, alternatively, one of the following materials:

| Example | Material Added |
| --- | --- |
| 2D | 30 grams of a 6.7% solution of $KH_2PO_4$ |
| 2E | 30 grams of a 10.0% solution of $KH_2PO_4$ |
| 2F | 30 grams of a 13.3% solution of $KH_2PO_4$ |
| 2G | 30 grams of a 20.0% solution of $KH_2PO_4$ |
| 2H | 30 grams of a solution containing 3.5 grams of poly(acrylic acid) (Acrysol A-1) and 0.27 grams KOH |

After addition of the above materials, the encapsulation process and subsequent processes, including capsule coating, were performed as in Example 1.

The capsule slurry viscosity and coated capsule permeability tests were performed for each of the batches of Example 2, using the methods previously described. The results obtained are listed below:

| Example | Total poly (acrylic acid) | Added salt | Batch pH after encapsulation | Final batch viscosity | Permeability |
|---|---|---|---|---|---|
| 2D | 1.5 grams | 2 grams $KH_2PO_4$ | 5.15 | 61 cps | 4.2% |
| 2E | 1.5 grams | 3 grams $KH_2PO_4$ | 5.10 | 49 cps | 3.7% |
| 2F | 1.5 grams | 4 grams $KH_2PO_4$ | 5.05 | 44 cps | 4.0% |
| 2G | 1.5 grams | 6 grams $KH_2PO_4$ | 5.00 | 41 cps | 3.6% |
| 2H | 5.0 grams | none | 4.60 | 1374 cps | 4.4% |

The above results demonstrate that the combined beneficial results of batch viscosity and capsule permeability can be obtained over a wide range of salt quantities.

EXAMPLE 3

The procedure of Example 1 was substantially repeated through the emulsification step using the same relative amounts of the same components. Into 170 gram portions of the resulting emulsion was added, alternatively, one of the following materials:

| Example | Material Added |
|---|---|
| 3I | 30 grams of a solution containing 2.14 grams of $H_3PO_4$ and 0.95 gram $LiOH.H_2O$ |
| 3J | 30 grams of a solution containing 2.14 grams of $H_3PO_4$ and 0.9 gram of NaOH |
| 3K | 30 grams of a solution containing 2.14 grams of $H_3PO_4$ and 1.19 grams of KOH |
| 3L | 30 grams of a solution containing 2.14 grams of $H_3PO_4$ and 3.14 grams of CsOH |
| 3M | 30 grams of a solution containing 2.14 grams of $H_3PO_4$ and 3.32 grams of $(HOC_2H_4)_3N$ |
| 3N | 30 grams of a solution containing 2.14 grams of $H_3PO_4$ and 4.70 grams of $(HOC_2H_4)_4NOH$ |
| 3O | 30 grams of a solution containing 0.5 gram of acetic acid |

After addition of the above materials, the encapsulation process and subsequent processes, including capsule coating, were performed as in Example 1. During the encapsulation step, Example 3O coagulated, resulting in a batch which did not produce satisfactory capsules and which could not subsequently be evaluated in the viscosity and permeability tests.

The capsule slurry viscosity and coated capsule permeability tests were performed for each of the batches of Examples 3 I-N, using the methods previously described. The results obtained are listed below:

| Example | Added salt | Batch pH after encapsulation | Final batch viscosity | permeability |
|---|---|---|---|---|
| 3I | lithium phosphate | 5.05 | 49 cps | 4.1% |
| 3J | sodium phosphate | 5.10 | 52 cps | 4.2% |
| 3K | potassium phosphate | 5.10 | 50 cps | 3.8% |
| 3L | cesium phosphate | 5.10 | 54 cps | 3.2% |
| 3M | tertiary amine phosphate | 5.15 | 43 cps | 3.4% |
| 3N | quaternary amine phosphate | 5.15 | 44 cps | 4.2% |
| 3O | none | 4.70 | coagulated | — |

The above results demonstrate that Group IA and low molecular weight, water-soluble tertiary and quaternary amine cations are effective in the practice of the present invention. Example 3O demonstrates that the beneficial effects of the present invention are not merely the result of pH adjustment. Acetic acid was used in this example because of the difficulty of obtaining the proper pH using the strong acid $H_3PO_4$.

EXAMPLE 4

The procedure of Example 1 was substantially repeated through the emulsification step using the same relative amounts of the same components. Into 170 gram portions of the resulting emulsion was added, alternatively, one of the following materials:

| Example | Material Added |
|---|---|
| 4P | 30 grams of 10% $KH_2PO_4$ |
| 4Q | 30 grams of 10% KCl |
| 4R | 30 grams of 10% $K_2SO_4$ |
| 4S | 30 grams of 10% $KNO_3$ |
| 4T | 30 grams of a solution containing 2.5 grams of citric acid & 1.0 gram of KOH |

The capsule slurry viscosity and coated capsule permeability tests were performed for each of the batches of Example 4, using the methods previously described. The results obtained are listed below:

| Example | Added salt | Batch pH after encapsulation | Final batch viscosity | permeability |
|---|---|---|---|---|
| 4P | potassium phosphate | 5.10 | 46 cps | 4.6% |
| 4Q | potassium chloride | 5.00 | 35 cps | 3.9% |
| 4R | potassium sulfate | 5.10 | 48 cps | 4.3% |
| 4S | potassium nitrate | 5.10 | 49 cps | 3.8% |
| 4T | potassium citrate | 4.90 | 24 cps | 4.6% |

The above results demonstrate that salts containing anions of common, strong inorganic acids and anions of water soluble, strong organic acids are effective in the practice of the present invention.

EXAMPLE 5

The procedure of Example 1 was substantially repeated through the emulsification step with the exception that poly(ethylene-co-maleic anhydride), M.W. about 75,000–90,000 ("EMA-31", Monsanto Company, St. Louis, Mo.) was substituted for the poly(acrylic acid) on an equal relative weight basis and the EMA was partially neutralized with 11.97 grams of trisopropanol amine. The remainder of the process through the emulsification step was substantially the same as Example 1 using the same relative amounts of components.

Into 170 gram portions of the resulting emulsion was added, alternatively, one of the following materials:

| Example | Material Added |
|---------|----------------|
| 5U | 30 grams water |
| 5V | 30 grams of 10% KH$_2$PO$_4$ |

The capsule slurry viscosity and coated capsule permeability tests were performed for the batches of Example 5, using the methods previously described. The results obtained are listed below.

| Example | Added salt | Batch pH after encapsulation | Final batch viscosity | permeability |
|---------|-----------|------------------------------|----------------------|--------------|
| 5U | none | 5.05 | 220 cps | 6.6% |
| 5V | potassium phosphate | 4.80 | 71 cps | 3.8% |

The above results demonstrate that the present invention, when used with carboxyl group system modifiers of U.S. Pat. No. 4,100,103, other than PAA, provides a somewhat less but nevertheless significant and unexpected beneficial effect on the viscosity and permeability properties of the resulting capsule batch.

EXAMPLE 6

The procedure of Example 1 was substantially repeated through the emulsification step with the exception that poly(styrene-co-maleic anhydride) (hereinafter referred to as SMA) (Scripset 520, Monsanto Company, St. Louis, Mo.) was substituted for the poly(acrylic acid) on an equal relative weight basis. The SMA was hydrolyzed by stirring in warm water with a quantity of KOH added such that the equivalents ratio of potassium ion to the carboxylic acid of the SMA was 0.3:1. The use of trisopropanol amine was eliminated from Example 6. The process through the emulsification step was substantially the same as Example 1 using the same relative amounts of components.

Into 170 gram portions of the resulting emulsion was added, alternatively, one of the following materials.

| Example | Material Added |
|---------|----------------|
| 6W | 30 grams water |
| 6X | 30 grams 10% KH$_2$PO$_4$ |

The capsule slurry viscosity and coated capsule permeability tests were performed for the batches of Example 6, using the methods previously described. The results obtained are listed below.

| Example | Added salt | Batch pH after encapsulation | Final batch viscosity | permeability |
|---------|-----------|------------------------------|----------------------|--------------|
| 6W | none | 5.95 | 332 cps | 74% |
| 6X | potassium phosphate | 5.55 | 46 cps | 20% |

The above results demonstrate that the present invention, when applied to a process using SMA as the system modifier, provides significant and unexpected beneficial results on the viscosity and permeability properties of the resulting capsule batch.

EXAMPLE 7

The procedure of Example 6 was substantially repeated with the exception that a reaction product of melamine and formaldehyde was substituted for the partially methylated methylol melamine resin on an equal relative weight basis. The melamine and formaldehyde reaction product was made by heating a mixture of 15 grams of melamine, 37.5 grams of 37% formaldehyde and 52.5 grams of water to 76° C. with stirring until a clear solution was obtained (about 20 minutes). This solution was then used in place of the previously described Cymel. The remainder of the process through the emulsification step was substantially the same as Example 6, using the same relative amounts of components.

Into 170 gram portions of the resulting emulsion was added, alternatively, one of the following materials:

| Example | Material Added |
|---------|----------------|
| 7Y | 30 grams water |
| 7Z | 30 grams 10% KH$_2$PO$_4$ |

The capsule permeability test was performed for the batches of Example 7, using the method previously described. The results obtained are listed below.

| Example | Added Salt | Batch pH after encapsulation | Permeability |
|---------|-----------|------------------------------|--------------|
| 7Y | none | 6.15 | 25.4% |
| 7Z | potassium phosphate | 5.60 | 6.1% |

The above results demonstrate that the present invention, when applied to the process of U.S. Pat. No. 4,233,178, provides significant and beneficial results on the permeability properties of the resulting capsule batch.

The invention being thus described, it will be obvious that the same may be varied in many ways. Such variations are not to be regarded as a departure from the spirit and scope of the invention and all such modifications are intended to be included within the scope of the following claims.

I claim:

1. A process for manufacturing minute capsules, en masse, in an aqueous manufacturing vehicle, comprising:
   establishing an agitating aqueous system comprising
   (A) melamine and formaldehyde;
   (B) monomeric methylol melamine or a low molecular weight polymer thereof; or
   (C) monomeric methylated methylol melamine or a low molecular weight polymer thereof as a starting material or mixtures of any of said starting materials, about 0.4 to about 15 percent by weight, based on the weight of aqueous manufacturing vehicle, of a system modifier material selected from the group consisting of poly(ethylene-co-maleic anhydride), poly(methyl vinyl ether-co-maleic anhydride), poly(acrylic acid), poly(propylene-co-maleic anhydride), poly(- butadiene-co-maleic anhydride), poly(vinyl acetate-co-maleic anhydride) and poly(styrene-co-maleic anhydride), about 1 to about 10 percent by weight, based on the weight of aqueous manufacturing vehicle, of a salt selected from the group consisting of Periodic Group IA cations and tertiary and quaternary ammonium cations and chloride, sulfate, phosphate, nitrate, polyphosphate, citrate, maleate and fumarate anions, and particles of an intended capsule core material substantially insoluble in the system, in which agitating system the modifier is present prior to the addition of said particles, whereby said starting material polycondenses to form a condensation polymer resulting in
  (i) liquid-liquid phase separation of the resulting condensation polymer above a molecular weight to be soluble in the system; and
  (ii) continued polycondensation of the separated polymerization product to give solid capsule wall material individually surrounding particles of the dispersed intended capsule core wherein said salt is present in the aqueous manufacturing vehicle prior to the polycondensation, whereby increased capsule wall integrity and reduced capsule slurry viscosity are obtained.

2. The process of claim 1 wherein the system modifier material is selected from the group consisting of poly(acrylic acid) and poly(styrene-co-maleic anhydride).

3. The process of claim 2 wherein the system modifier material is poly(acrylic acid).

4. The process of claim 1 wherein the polycondensation reaction is effected at a temperature of about 40° C. to about 95° C.

5. The process of claim 4 wherein the polycondensation reaction is effected at a temperature of about 50° C. to about 60° C.

6. The process of claim 1, 3 or 5 wherein the salt is potassium phosphate.

7. A process for manufacturing minute capsules, en masse, in an aqueous manufacturing vehicle, comprising the steps of:
  (A) establishing an agitating single-phase aqueous solution system comprising about 0.4 to about 15 percent by weight, based on the weight of aqueous manufacturing vehicle, of a system modifier material selected from the group consisting of poly(ethylene-co-maleic anhydride), poly(methyl vinyl ether-co-maleic anhydride), poly(acrylic acid), poly(propylene-co-maleic anhydride), poly(butadiene-co-maleic anhydride), poly(vinyl acetate-co-maleic anhydride) and poly(styrene-co-maleic anhydride);
  (B) adding a starting material which comprises (a) melamine and formaldehyde, (b) monomeric methylol melamine or a low molecular weight polymer thereof or (c) monomeric methylated methylol melamine or a low molecular weight polymer thereof, or mixtures of any of said (a), (b) and (c) to the system;
  (C) dispersing into the solution system particles of an intended capsule core material substantially insoluble in the system;
  (D) adding about 1 to about 10 percent by weight, based on the weight of the aqueous manufacturing vehicle, of a salt selected from the group consisting of Periodic Group IA cations and tertiary and quaternary ammonium cations and chloride, sulfate, phosphate, nitrate, polyphosphate, citrate, maleate and fumarate anions; and
  (E) polycondensing said starting material to form a condensation polymer resulting in
    (i) liquid-liquid phase separation of the resulting condensation polymer above a molecular weight to be soluble in the system; and
    (ii) continued polycondensation of the separated polymerization product to give solid capsule wall material individually surrounding particles of the dispersed intended capsule core, whereby increased capsule wall integrity and reduced capsule slurry viscosity are obtained.

8. The process of claim 7 wherein the salt is selected from the group consisting of Periodic Group IA cations and chloride, sulfate, phosphate and nitrate anions.

9. The process of claim 8 wherein the salt is potassium phosphate.

10. The process of claims 7, 8 or 9 wherein the polycondensation reaction is effected at a temperature of about 40° C. to about 95° C.

11. The process of claim 10 wherein the polycondensation reaction is effected at a temperature of about 50° C. to about 60° C.

* * * * *